US008606435B2

(12) United States Patent
Bourzier

(10) Patent No.: US 8,606,435 B2
(45) Date of Patent: Dec. 10, 2013

(54) METHOD AND A SYSTEM FOR ESTIMATING A TRAJECTORY OF A MOVING BODY

(75) Inventor: Laurent Bourzier, Bourges (FR)

(73) Assignee: MBDA France, Paris (FR)

( * ) Notice: Subject to any disclaimer, the term of this patent is extended or adjusted under 35 U.S.C. 154(b) by 116 days.

(21) Appl. No.: 13/319,905

(22) PCT Filed: May 12, 2010

(86) PCT No.: PCT/FR2010/050923
§ 371 (c)(1),
(2), (4) Date: Feb. 2, 2012

(87) PCT Pub. No.: WO2010/130953
PCT Pub. Date: Nov. 18, 2010

(65) Prior Publication Data
US 2012/0123615 A1 May 17, 2012

(30) Foreign Application Priority Data

May 15, 2009 (FR) ...................................... 09 53222

(51) Int. Cl.
*G01C 23/00* (2006.01)
*G05D 1/00* (2006.01)
*G05D 3/00* (2006.01)
*G06F 7/00* (2006.01)
*G06F 17/00* (2006.01)

(52) U.S. Cl.
USPC ................... 701/3; 701/23; 701/24; 701/466; 701/518; 701/519; 244/3.1; 244/3.15; 244/75.1; 244/76 R

(58) Field of Classification Search
USPC ......... 701/3, 8, 13, 23, 24, 27, 400, 408, 466, 701/494, 495, 500, 501, 502, 518, 5, 19, 701/528, 534; 244/3.1, 3.15, 158.1, 4 R, 24, 244/75.1, 76 R
See application file for complete search history.

(56) References Cited

U.S. PATENT DOCUMENTS 5,459,659 A * 10/1995 Takenaka ...................... 700/260
6,298,318 B1 * 10/2001 Lin ................................. 703/23
(Continued)

FOREIGN PATENT DOCUMENTS

| EP | 1 909 067 | 4/2008 |
| FR | 2 642 515 | 8/1990 |
| FR | 2 927 418 | 8/2009 |

OTHER PUBLICATIONS

International Search Report as issued for PCT/FR2010/050923.

*Primary Examiner* — Rami Khatib
(74) *Attorney, Agent, or Firm* — Pillsbury Winthrop Shaw Pittman, LLP

(57) ABSTRACT

A hybrid simulation method uses a simulator tool feeding kinematics commands to a movement simulator on which a moving body is mounted and to a target representative of an objective to be reached by the moving body, and on detection of an event representative of overshooting or changing a first designated objective for this moving body, the method includes a positioning stage associated with a second designated objective for the moving body, including comparing positions executed by the movement simulator in response to transition kinematics commands with a first predetermined setpoint position and activating a first marker if a position substantially the same as the first setpoint position is detected; comparing positions executed by the target in response to transition kinematics commands with a second predetermined setpoint position and activating a second marker if a position substantially the same as the second setpoint position is detected; when the first and second markers are activated, a step of evaluating a difference between the current kinematics command supplied to the movement simulator and the target by the digital simulator tool; and, if this difference is below a particular threshold, a piloting stage including applying corrective terms linked to the setpoint positions to the kinematics commands coming from the simulator tool before they are fed to the movement simulator and to the target.

12 Claims, 4 Drawing Sheets

(56) References Cited

U.S. PATENT DOCUMENTS 6,735,523 B1 * 5/2004 Lin et al. .................. 701/470
6,978,965 B1 * 12/2005 Hartmann et al. ........... 244/3.16
7,795,565 B2 * 9/2010 Bock ............................ 244/3.15
8,346,517 B2 * 1/2013 Bourzier ......................... 703/2

* cited by examiner

METHOD AND A SYSTEM FOR ESTIMATING A TRAJECTORY OF A MOVING BODY

CROSS REFERENCE TO RELATED APPLICATIONS

This application is the U.S. National Stage of PCT/FR2010/050923, filed May 12, 2010, which in turn claims priority to French Patent Application No. 0953222, filed May 15, 2009, the entire contents of all applications are incorporated herein by reference in their entireties.

BACKGROUND OF THE INVENTION

The field of the present invention is validating the operational capabilities of a moving or airborne body, for example a drone, a missile, etc.

The invention relates more particularly to estimating the trajectory of a moving body in a real navigation environment, notably after detecting an overshoot of a designated objective for the moving body or a change of objective. Here objective means a target or destination that the moving body is to reach, designated in the form of geographical coordinates, for example.

In the meaning of the invention, references to a moving body "overshooting" an objective mean that the moving body has not reached the objective (for example it has missed the objective). Similarly, the remainder of the description refers to a moving body "attacking" an objective while it is attempting to reach the objective.

Thus, although this is not limiting on the invention, the invention preferably enables evaluation of the ability of a moving body to re-attack an objective that has been missed and/or to change objective during a mission.

In the current state of the art, there are hybrid simulation methods for estimating the trajectory of a moving body such as an aircraft or a rocket accurately and at reasonable cost.

Those hybrid simulation methods rely:
  firstly, on real subsystems, for example an angular movement simulator on which is mounted the moving body or part of the moving body comprising certain elements of the moving body such as its inertial navigation system, its computer, etc.; and
  secondly, on mathematical models replacing elements of the moving body that are not used and modeling the navigation environment of the moving body, for example a mathematical model for its propulsion, its aerodynamics, the atmosphere, the Earth, etc.

One such simulation method is described in Document EP 1 909 067 and in Document FR 08/50793, published under the number 2 927 418, for example. It is used to validate an inertial navigation system on board of a moving body by comparing a trajectory of the moving body estimated by the hybrid simulation method with a reference trajectory.

Nevertheless, there is at present no hybrid simulation method or system that enables the trajectory of a moving body to be estimated after detection of an event representative of that moving body overshooting an objective to be reached or of a change of objective requiring to achieve it angular movements exceeding those offered by the means implemented in the hybrid simulation system, notably with a view to making it possible to evaluate the ability of the moving body to re-attack an objective or to change objective during a mission.

SUBJECT AND SUMMARY OF THE INVENTION

The invention responds to this requirement by proposing a method of estimating a trajectory of a moving body in a real navigation environment, including a digital simulator tool that is modeling the moving body in this environment supplying kinematics commands to a movement simulator on which the moving body is mounted and to a target representative of an objective to be reached by the moving body, the simulator tool being fed with piloting commands delivered by a computer of the moving body and, in response to the piloting commands, delivering points of the trajectory. According to the invention the estimation method further includes:
  on detection of an event representative of overshooting or changing a first designated objective for the moving body, a positioning stage associated with a second designated objective for the moving body, the positioning stage including:
    comparing positions executed by the movement simulator in response to first transition kinematics commands with a first predetermined setpoint position and activating a first marker if a position substantially equal to the first setpoint position is detected; and
    comparing positions executed by the target in response to second transition kinematics commands with a second predetermined setpoint position and activating a second marker if a position substantially equal to the second setpoint position is detected;
  if the first and second markers are activated, a step of evaluating a difference between the current kinematics command supplied to the movement simulator and the current kinematics command supplied to the target by the digital simulator tool; and
  if this difference is below a particular threshold, a piloting stage including applying corrective terms linked to said setpoint positions to the kinematics commands coming from the simulator tool before they are fed to the movement simulator and to the target.

In a correlated manner, the invention also provides a hybrid simulation system for estimating a trajectory of a moving body in a real navigation environment, said system including:
  a movement simulator on which the moving body is mounted;
  a target representative of an objective to be reached by the moving body; and
  a digital simulator tool for modeling the moving body in the real navigation environment and feeding kinematics commands to the movement simulator and the target, this simulator tool being fed with piloting commands delivered by a computer of the moving body and delivering points of the trajectory in response to those piloting commands;
said system further including:
  means for detecting an event representative of overshooting or changing a first designated objective for the moving body;
  means activated on detection of such an event and during a positioning stage associated with a second designated objective for the moving body:
    for comparing positions executed by the movement simulator in response to first transition kinematics commands with a first predetermined setpoint position and activating a first marker when a position substantially the same as the first setpoint position is detected; and
    for comparing positions executed by the target in response to second transition kinematics commands with a second predetermined setpoint position and activating a second marker when a position substantially the same as the second setpoint position is detected;

means for detecting when the first and second markers are activated and should the case occur, for evaluating a difference between the current kinematics command fed to the movement simulator and the current kinematics command fed to the target by the simulator tool;

means for comparing this difference with a particular threshold; and means activated when the difference is below said threshold to apply, during a piloting stage, corrective terms linked to the setpoint positions to the kinematics commands coming from the simulator tool before they are fed to the movement simulator and to the target.

Thus the invention is advantageously based on a closed loop hybrid simulator. This includes a digital simulator tool and hardware such as a movement simulator on which the moving body is mounted, a target representing the objective to be reached by the moving body, and a computer of the moving body adapted to deliver piloting commands to the digital simulator tool, thus enabling calculation of points on the trajectory. Thus the trajectory of the moving body estimated by means of the invention is very close to a real trajectory that the moving body would follow.

If the second objective is the same as the first objective, this trajectory reflects the behavior of the moving body in the event of overshooting its objective and re-attacking it. Conversely, if the first and second objectives are different, the trajectory estimated using the invention reflects the behavior of the moving body in the event of a change of objective effected during the mission.

During a so-called positioning stage, the target and the moving body are positioned relative to predetermined setpoint positions by means of transition kinematics commands substituted for the kinematics commands output by the simulator tool and fed to the movement simulator and to the target. This simplifies positioning the moving body and the target during the positioning stage. This positioning stage ensures that the estimate of the trajectory obtained is an accurate representation of a predefined stage of the attack on the second objective.

These setpoint positions are therefore preferably chosen so that it is possible to estimate the trajectory of the moving body corresponding to activating the terminal guidance equipment of the moving body (for example its homing (or seeker) device) in order to reach the second objective. This stage corresponds in fact to a critical stage in detecting and tracking the second objective. An analysis of the estimated trajectory of the moving body in this stage makes it possible to determine whether the moving body has reached the second objective. It is then possible to evaluate, as a function of the designated objectives for the moving body, its ability to re-attack an objective or to change objective and target a new objective during a mission.

As is known in the art, currently available angular movement simulators and targets have, for reasons of cost and feasibility, limited capabilities, notably in terms of angular movement (i.e. excursion): for example, plus or minus 110° for an angular movement simulator, plus or minus 40° for a moving body target. This limitation is moreover made worse by using cables and test benches to implement the interfaces between the various elements of the hybrid simulator.

The invention proposes to compensate these limited angular movements by applying corrective terms to the kinematics commands issued by the simulator tool during a so-called piloting stage before they are fed to the movement simulator and to the target. These corrective terms are linked to setpoint positions for the target and the moving body. Using the invention, it is thus possible to estimate any trajectory of a moving body independently of the position of first and second objectives.

Note that, in the meaning of the invention, application of a corrective term to a kinematics command refers to applying a corrective term to one or more of the components of that kinetic command (or even all its components), the value of the corrective term applied possibly differing depending on the component.

A particularly beneficial application of the invention is to a situation in which the position of the second objective relative to the position of the first objective requires the moving body to follow a trajectory that is incompatible with the angular movement capabilities of the movement simulator and the target. This situation arises in particular if the second objective is the same as the first objective and the moving body must effect a virtually complete rotation to realign itself in the direction of the target.

In the estimation method of one particular implementation of the invention, the kinematics commands fed by the simulator tool to the movement simulator include a yaw component and the kinematics command fed by the simulator tool to the target include a relative bearing component. Here relative bearing component means the angular component of the kinematics command in the horizontal plane. In this implementation, until an event representative of overshooting or changing a first designated objective for this moving body is detected, an angular compensation term is applied to the yaw components and to the relative bearing components of the kinematics commands before they are fed to the movement simulator and to the target, respectively.

Accordingly, in this particular implementation, compensation is also applied during the attack of the moving body on the first objective. This compensation avoids producing a trajectory to be followed by the moving body in order to reach the first objective that is incompatible with the angular capabilities of the movement simulator and of the target.

For example, if the trajectory of the moving body is towards the south and the yaw axis of the movement simulator has a relative angular movement enabling it to assume an angular position of plus or minus 90° relative to the north, an angular compensation of 180° may be applied to simulate a trajectory towards the south. The angular shift is applied both to the yaw axis of the kinematics command of the movement simulator and to the relative bearing axis of the kinematics command of the target.

In one particular implementation, if a change of direction of the moving body is required in order to reach the second objective relative to a direction taken by the moving body to reach the first objective, the positioning stage further includes a step of determining the direction of rotation in which to turn the moving body to change its direction, the first and second setpoint positions being chosen as a function of that direction of rotation.

In fact, to turn into the supposed direction of the target, the moving body may, without this being known in advance, effect a clockwise or counterclockwise change of direction.

This implementation makes it possible to adapt the setpoint positions for the target and for the movement simulator as a function of the direction of rotation of the moving body, enabling realistic:

termination of the stage of aligning the moving body with the second objective;

activation of the terminal guidance equipment of the moving body; and terminal guidance of the moving body to the second objective in order to reach it.

In one variant, the transition kinematics commands fed to the movement simulator and to the target may be constant during the determination step. For example, these constant transition kinematics commands may include the positions executed by the movement simulator and by the target at the moment the event is detected.

In one particular implementation of the invention, the threshold to cross in order to access the piloting stage depends on the positions executed by the movement simulator and by the target, respectively, during activation of the first and second markers, respectively, and the direction of rotation in which to turn the moving body in order to change its direction.

Alternatively, the threshold may be predetermined and may depend in particular on setpoint positions.

In one implementation of the invention, the piloting stage further includes evaluation of the corrective terms from:
the setpoint positions; and
the kinematics commands supplied by the simulator tool at the moment it is detected that the difference is below the predetermined threshold.

In another implementation of the invention, the piloting stage further includes a step of evaluating the corrective terms from:
the positions executed by the movement simulator and the target at the moment of activating the first and second markers, respectively; and
the kinematics commands supplied by the simulator tool at the moment it is detected that the difference is below the particular threshold.

This yields more accurate values for the corrective terms to be applied to the kinematics commands before they are fed to the movement simulator and to the target.

In one particular implementation, the piloting commands are evaluated by the computer of the moving body from:
measurement inertial data supplied by an inertial navigation system of the moving body mounted on the movement simulator;
simulation inertial data representative of inertial data deemed to be supplied by the inertial navigation system in the real navigation environment; and
theoretical inertial data representative of measurement inertial data supplied by the inertial navigation system and evaluated from kinematics commands executed by the movement simulator.

The piloting commands are preferably calculated as a function of inertial data I defined by $I=T2+R-T1$ where T2, R, and T1 designate simulation inertial data, measurement inertial data, and theoretical inertial data, respectively.

Thus in estimating the trajectory of the moving body the positioning stage is transparent.

In fact, the measurement inertial data and the theoretical inertial data depend on the kinematics commands (i.e. data) actually executed by the movement simulator and they remain mutually consistent, even if the movement simulator does not execute the kinematics commands correctly or if said commands are not correctly dimensioned.

Accordingly, whatever kinematics commands are fed to the movement simulator (or even, in an extreme situation, if no variable kinematics commands are fed to the movement simulator), this has no impact on the piloting commands and therefore no impact on the estimated trajectory.

Thus an underspecified movement simulator may be used for highly dynamic angular transients of the trajectory. This enables an accurate trajectory of the moving body to be obtained at lower cost.

In another implementation the piloting commands are evaluated by the computer of the moving body from inertial data obtained only by simulation.

BRIEF DESCRIPTION OF THE DRAWINGS

Other features and advantages of the present invention emerge from the description given below with reference to the appended drawings, which show a non-limiting embodiment of the present invention. In the figures.

DETAILED DESCRIPTION OF ONE EMBODIMENT

As described above, the invention provides a method and a system for estimating a trajectory of a moving body, such as a drone or a missile, in a real navigation environment, for example in order to evaluate its ability to re-attack an objective or to change objective during a mission and attack the new objectives.

According to the invention, the trajectory of the moving body is computed using a hybrid simulation architecture employing both real subsystems (e.g. the moving body's onboard computer and inertial navigation system, an angular movement simulator, a target representative of an objective to be reached by the moving body) and also digital models of the moving body (e.g. models of its propulsion, fuel consumption, inertial navigation system) and its environment (e.g. models of the atmosphere, terrestrial effects).

In the present description, this trajectory is made up of different points each defined by a longitude/latitude/altitude triplet evaluated in a terrestrial frame of reference.

The hybrid simulation method used by the estimator system of the invention to calculate this trajectory proceeds in two stages and comprises:
a first part during which the moving body attempts to reach a first designated objective;
then a second part, which follows detection of an event representative of overshooting the first objective or a change of the first objective, and during which the moving body attempts to reach a second designated objective.

Note that the first and second objectives may be different or the second objective may be the same as the first objective. On this assumption, during the second part of the simulation, the moving body attempts to re-attack the same objective. This situation may arise in particular if the moving body misses its first objective.

Figure 1:
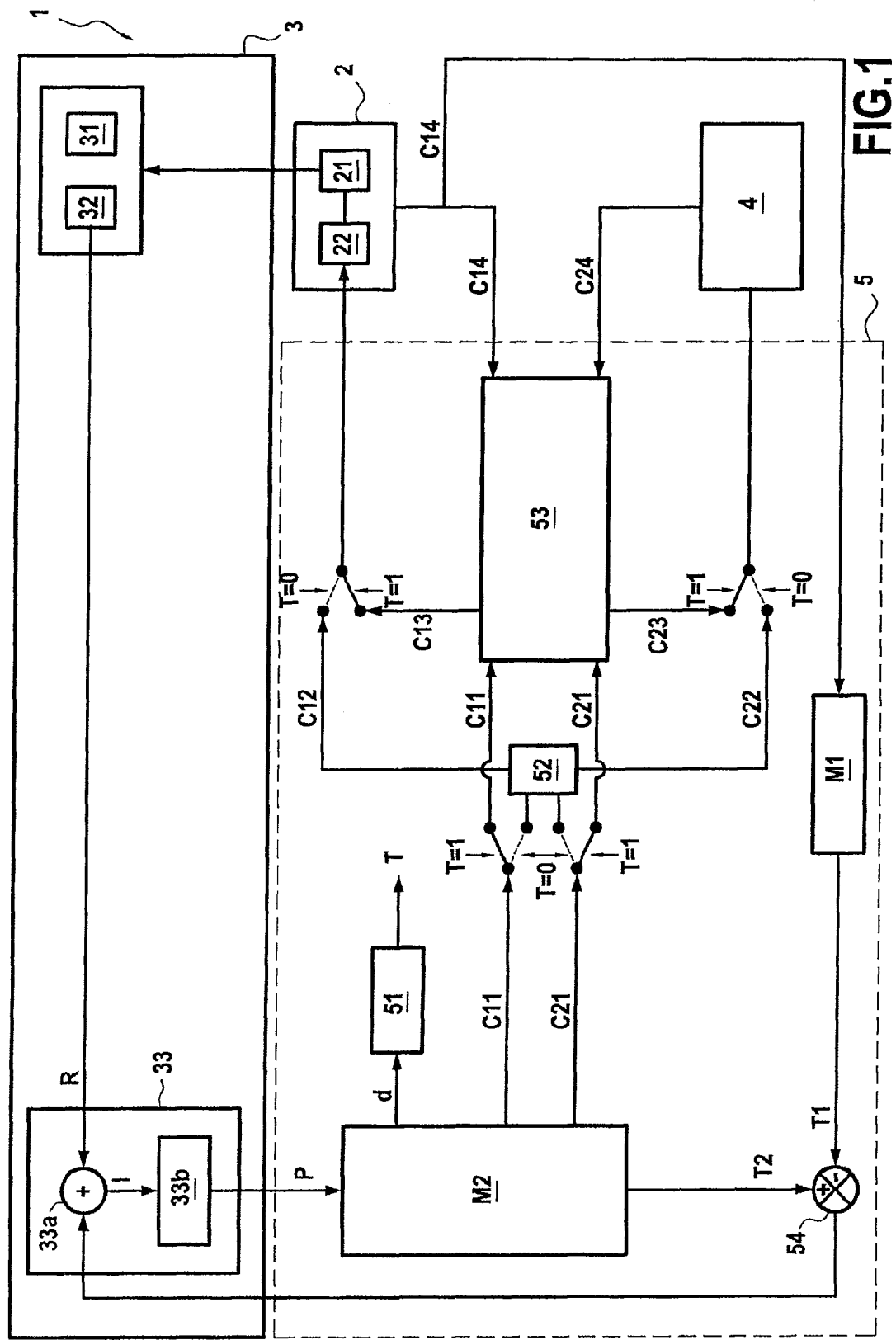
FIG. 1 shows an estimator system of one particular embodiment of the invention.

The estimation method of the invention is implemented in the form of a plurality of iterations executed in real time and in a closed loop by the above-mentioned hybrid simulation architecture. Each of these iterations produces a point on the calculated trajectory of the moving body. FIG. 1 shows diagrammatically an estimator system 1 of one particular embodiment of the invention implementing this hybrid simulation architecture.

The estimator system 1 includes an angular movement simulator 2 comprising a "3-axis" table 21 controlled by a digital control unit 22 and adapted to receive a moving body (or airborne body) 3. In the present example, the moving body 3 is a missile and the task is to evaluate its ability to re-attack a missed objective O1 (the first objective in the meaning of the invention). In this example the second objective in the meaning of the invention is therefore the same as the first objective. However, as described above, the invention applies equally if the first and second objectives are different.

The theory of operation of a "3-axis" table is known to the person skilled in the art and is not described in detail here. The angular movement simulator may instead use some other type of table, for example a "5-axis" table.

The angular movement simulator 2 executes angular movements about roll, pitch, and yaw axes and applies to the moving body 3 angular movements about those three axes. These angular movements are applied by the table 21 as a function of digital kinematics commands received from the unit 22. These commands include an angular position expressed in the form of three components respectively corresponding to the three axes of the movement simulator. They may also include an angular speed and an angular acceleration.

For simplicity, the remainder of the description is generally limited to kinematics commands comprising only an angular position. Of course, the person skilled in the art knows how to transpose the implementation described here to a situation where the kinematics commands also include an angular speed and/or an angular acceleration.

The movement simulator 2 is also adapted to provide kinematics commands C14 it has actually executed in response to kinematics commands that it has received. The yaw component of the angular position actually executed by the movement simulator is denoted lC14.

The moving body 3 mounted on the movement simulator is equipped with a terminal guidance device 31 and an inertial navigation system 32. The terminal guidance device 31 is a homing device, for example.

As known in the art, the terminal guidance device 31 is activated when the moving body is close to its objective. Conversely, on detection of overshooting the objective or if the moving body is too far away from the objective, the terminal guidance device 31 is inactive (or its output is no longer acted on, which amounts to the same thing).

The inertial navigation system 32 includes measurement tools such as gyros and accelerometers (not shown in the figure), enabling it to supply measurement inertial data R (i.e. rate gyroscope and accelerometer measurement information) in response to movements applied by the movement simulator 2.

The estimator system 1 of the invention also includes a target 4 representative of an objective to be reached by the moving body (the first or second objective as a function of the part of the hybrid simulation concerned).

In the present example, this target is mounted on a carriage adapted to move on a part-circular rail in a horizontal plane in response to kinematics commands fed to it. These kinematics commands include an angular position, a component of which in the horizontal plane is defined relative to geographical north (relative bearing component). The target 4 is further adapted to provide its current position in response to these commands (i.e. the executed position in the meaning of the invention). The relative bearing component of this current position is denoted lC24.

Other targets may be used instead, for example airborne targets (e.g. 5-axis table), targets moving along a straight line, static targets with horns, etc. The position, in the meaning of the invention, of a target with horns is the position of the barycenter of the horns.

Note that, because of the assumption relating to the movement of the target in a horizontal plane, it is essentially the yaw and relative bearing components of the angular positions of the moving body and the target that are relevant here. However, the invention may equally be applied if the target moves in a vertical plane or in a direction comprising a relative bearing component and an elevation component. In such situations, the operations described below applied to the yaw and relative bearing components of the angular positions of the kinematics commands are also applied to the pitch component for the moving body and the elevation component for the target.

The angular movement simulator 2 and the target 4 are moreover connected to at least one data processor device or computer 5 used to implement the digital modeling elements of the hybrid simulation architecture, such as a theoretical model M1 and a simulator tool (simulator) M2.

The theoretical model M1 is adapted to provide a theoretical image T1 (theoretical inertial data in the meaning of the invention) of inertial data measured by the inertial navigation system 32 mounted on the movement simulator 2 (i.e. at the point with fixed coordinates in the laboratory in which the movement simulator 2 is located). In other words, theoretical inertial data supplied by the theoretical model M1 represents inertial data that the inertial navigation system 32 would measure at the point with fixed coordinates if it were a perfect system.

To calculate the theoretical image T1, the theoretical model M1 uses mathematical models of the physical phenomena acting on the moving body 3, and more particularly on the inertial navigation system 32 (theoretical expressions modeling terrestrial effects such as terrestrial rotation or local gravity), as well as effects linked to angular movements executed by the movement simulator 2. It uses in particular kinematics commands reflecting the positions, speeds, and accelerations actually applied to the moving body 3 by the movement simulator 2.

The simulator tool M2 models the moving body 3 in a real navigation environment, i.e. in a navigation environment around the Earth, taking into account local terrestrial effects on the moving body 3 (e.g. local gravity, terrestrial speed of rotation) and the objectives to be reached by the moving body. One such simulator tool that is known in the art relies on mathematical models of the elements constituting the moving body (notably an inertial navigation system model having characteristics corresponding to the nominal characteristics (tolerance medium) set out in the specifications of the inertial navigation system 32), a model of flight mechanics and of the flight environment, etc.

In the example described here, the simulator tool M2 acts during the hybrid simulation to calculate the following from the piloting commands P:
  a point X on the trajectory of the moving body in the real navigation environment;
  simulation inertial data T2 representative of the inertial data that the inertial navigation system 32 would provide in such an environment at this point on the trajectory; and kinematics commands C11 and C21 to the movement simulator 2 and the target 4, respectively, representing the movements to be applied to the moving body 3 and to the target 4 corresponding to this point on the trajectory.

The theoretical model M1 and the simulator tool M2 take the form of software stored in a read-only memory or a non-volatile memory (not shown) of the computer 5, for example.

The moving body 3 further includes an onboard computer 33 connected both to the inertial navigation system 32 and also to the computer 5. The onboard computer 33 is responsible in particular for control and guidance of the moving body 3 on the basis of inertial data I. It is provided with a "control" module 33b adapted to produce deflection instructions (piloting commands) for control units of the moving body that are compatible with the characteristics of the moving body (e.g. deflection instructions for aerodynamic control surfaces opening commands for a fuel flow regulator valve, etc.). The control module 33b is an automatic function, operating in real-time and using the inertial data I, to evaluate the execution of the instruction previously commanded and if necessary adapting the next command instruction as a function of a setpoint trajectory.

As a general rule an onboard computer of a moving body generates piloting commands P in particular from inertial data from rate gyros and accelerometers of the inertial navigation system of the moving body. In the validation system 1 of the invention, the inertial data I used by the onboard computer 33 depends on:

the measurement inertial data R;
the simulation inertial data T2; and
the theoretical inertial data T1.

To be more precise, in the present example, the onboard computer 33 evaluates piloting commands P from inertial data I satisfying the equation:

$$I=R+T2-T1$$

This calculation is known from Document EP 1 909 067 and Document FR 08 50793, published under the number 2 927 418, and consequently is not described in detail here.

Note that the connections between the computer 5, the movement simulator 2, the target 4, the onboard computer 33, and the inertial navigation system 32 may be made via electrical or optical cables, by radio, or by other means.

Figure 2:
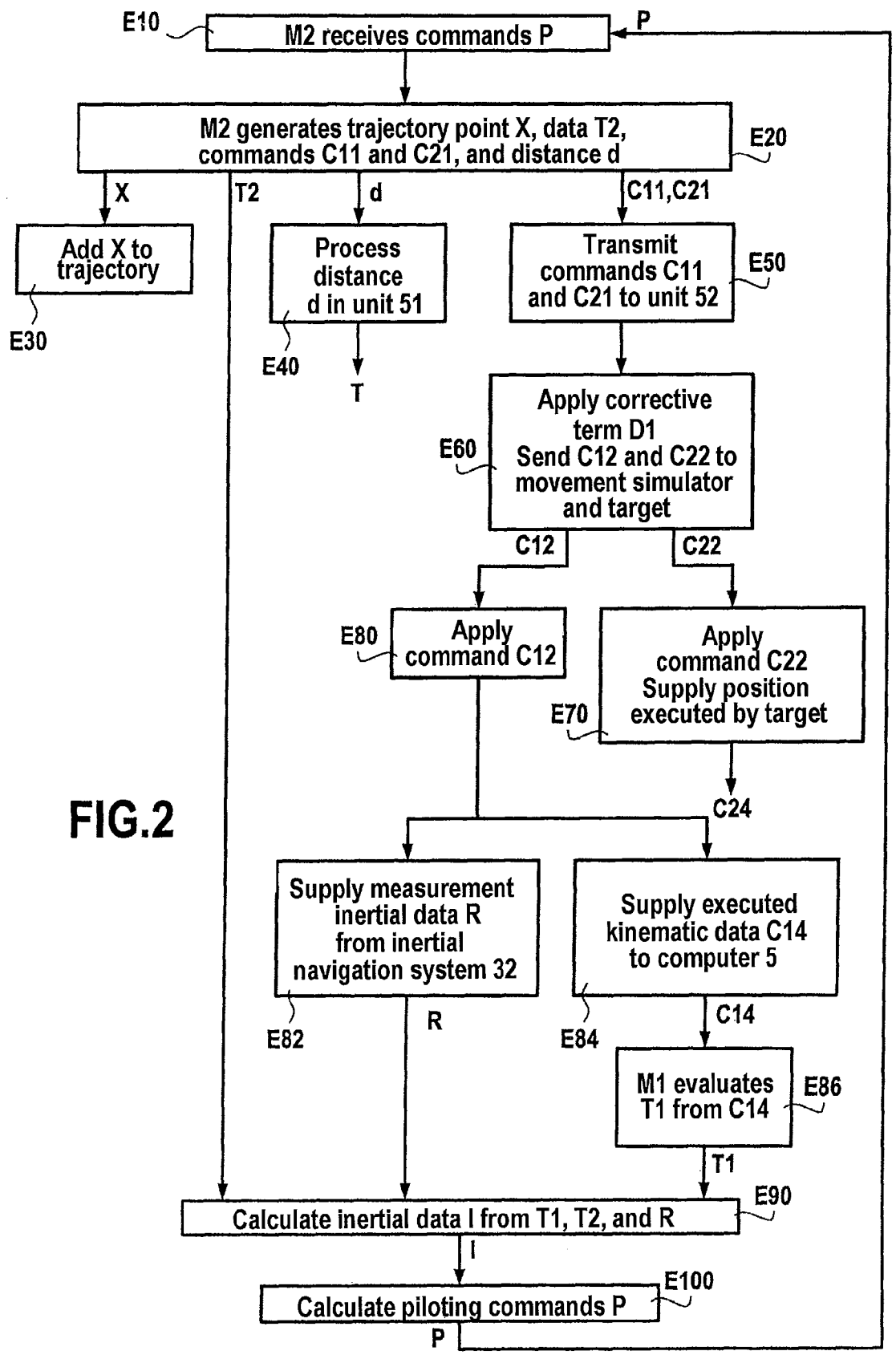
FIG. 2 shows the main steps of an estimation method of one particular implementation of the invention executed by the estimator system shown in FIG. 1 during a first part of the hybrid simulation in which the moving body attempts to reach a first designated objective.

There are described below with reference to FIG. 2 the main steps executed on each iteration of the first part of the estimation method of the invention by the validation system 1 to evaluate a point on the trajectory of the moving body 3. During this first part of the method, the moving body 3 attempts to reach the first designated objective O1.

The position of this first objective is stored in a memory of the moving body 3, for example, or the moving body 3 may receive it via a data link set up with a satellite, a helicopter, an aircraft, etc. It corresponds to a position expressed in a terrestrial frame of reference or a position relative to a known element of the moving body, such as its firing point.

As described above, each iteration i of the estimation method of the invention is implemented by the entities of the validation system 1 in real time and at a clock rate conditioned by the clock rate of the moving body. To be more precise, on each iteration, calculations and exchanges of data between the onboard computer 33 of the moving body, the simulator M2, the theoretical model M1, the angular movement simulator 2, the inertial navigation system 32, and the target 4 are effected at the real frequency for timing operations carried out by the moving body and advantageously within a delay that is less than the period corresponding to that frequency.

In the remainder of the description, the term "current" generally applies to data of the current iteration (e.g. applied or executed kinematics commands issued by the simulator tool, inertial information, etc.).

During an iteration i, on reception of piloting commands P generated by the onboard computer 33 from inertial data I in the iteration i-1(step E10), the digital simulator tool M2 generates a point X on the trajectory of the moving body in the real navigation environment (step E20).

To this end, the tool M2 uses in particular a model of flight mechanics that enables it to calculate in response to the piloting commands P and in the real navigation environment the real position of the moving body (i.e. the point on the trajectory), namely its longitude, latitude, and altitude. This point X on the trajectory increments the trajectory of the moving body generated by the estimation method of the invention (step E30).

The simulator tool M2 also supplies in real time:

simulation inertial data T2 representative of the inertial data deemed to be measured by the inertial navigation system 32 for the new calculated trajectory point X in the real navigation environment;

kinematics commands C11 indicating the movement to be executed by the movement simulator 2 in response to the piloting commands P (i.e. the movement to be accomplished by the moving body to reach the new trajectory point X); the yaw component of the angular position contained in C11 and defined relative to geographical north is designated lC11; and digital kinematics commands C21 indicating the position to be taken by the moving body 3-target 4 axis; the relative bearing component of the angular position contained in the command C21 is designated lC21.

In the present example, the simulator tool M2 also supplies an estimate d of the distance between the moving body and the first objective. This estimate in particular enables a logic unit 51 to evaluate the position of the moving body relative to the first objective and to activate a transition T (T=1) when it detects that the moving body has overshot the first objective (step E40). Otherwise, by default, the transition is deactivated (T=0). In other words, the transition T is active during the second part of the hybrid simulation and inactive during the first part.

In the present example, the second part of the hybrid simulation coincides with designation of the second objective, in other words the final objective to be reached by the moving body. Of course, the designation of one or more intermediate objectives between the first objective and this "final" objective could nevertheless be envisaged, in which situation the second part of the simulation, and to be more precise activation of the transition T, would be operative only from the designation of the final objective.

Figure 3A:
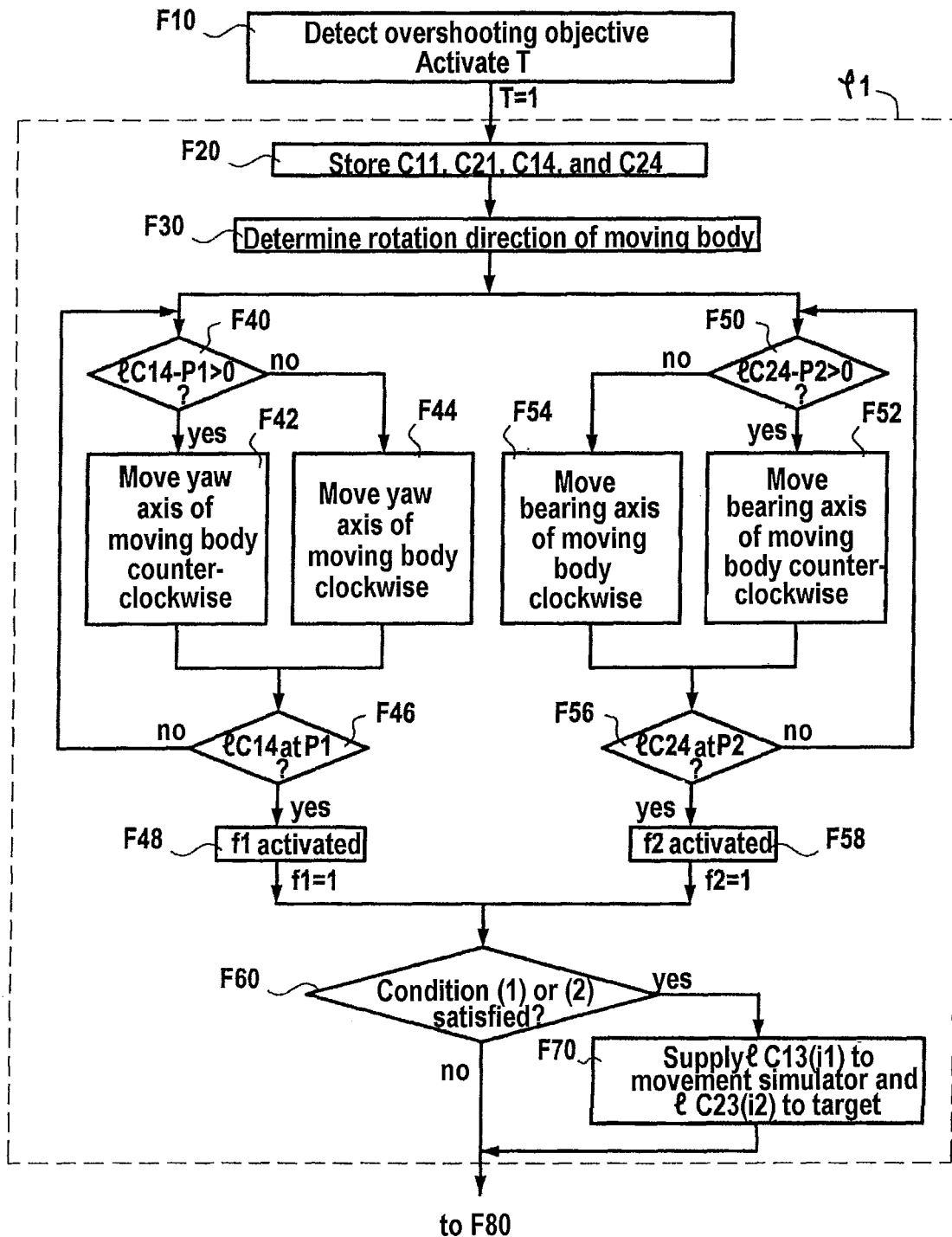
FIG. 3A shows the main steps of an estimation method of one particular implementation of the invention executed by the estimator system shown in FIG. 1 during a positioning stage of a second part of the hybrid simulation in which the moving body attempts to reach a second designated objective.
Figure 3B:
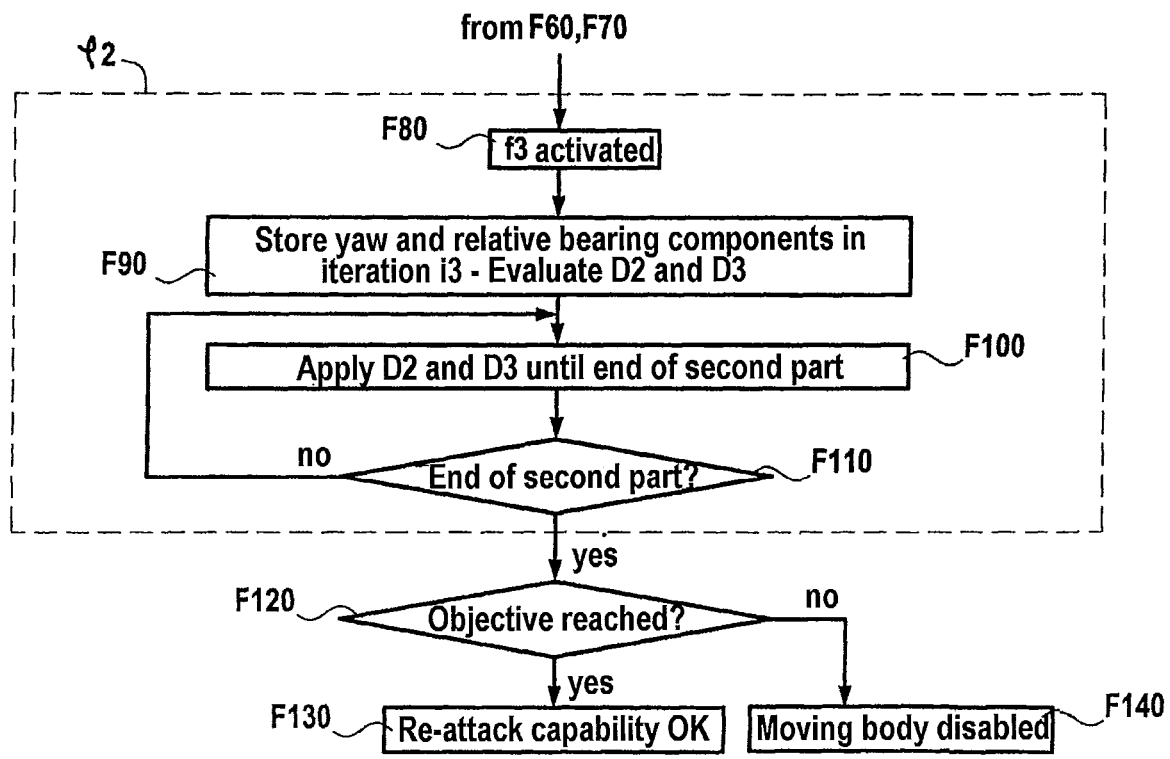
FIG. 3B shows the main steps of an estimation method of one particular implementation of the invention executed during a piloting stage of the second part of the hybrid simulation following the positioning stage shown in FIG. 3A.

The logic unit 51 is for example a function of a computer program or software stored in a read-only memory of the computer 5. Its operation is described in detail below with reference to FIGS. 3A and 3B.

In the present implementation, during the first part of the simulation, the kinematics commands C11 and C21 are sent to a logic unit 52 (step E50) before they are fed to the movement simulator 2 and to the target 4, respectively. The logic unit 52 is for example a function of a computer program or software stored in a read-only memory of the computer 5. This logic unit 52 is adapted to produce kinematics commands C21 and C22 from kinematics commands C11 and C21 coming from the simulator tool.

To this end, it applies a non-zero corrective term D1 to the components lC11 and lC21 of the kinematics commands C11 and C21 if the trajectory of the moving body to reach the first objective is deemed incompatible with the angular (relative movement) capabilities of the movement simulator 2 and the target 4. Otherwise, D1 is taken as zero here, in order to simplify the architecture of the hybrid simulator.

Note that the corrective term D1 is applied by the logic unit 52 only during the first part of the hybrid simulation, i.e. while the moving body is attempting to reach the first objective (in other words when the transition T is inactive, i.e. T=0).

To determine whether the trajectory of the moving body to reach the first objective is incompatible with the angular capabilities of the movement simulator 2, before performing the hybrid simulation with the real elements, a digital simulation may be effected, for example using the model M2 (which in this situation includes an onboard computer model), or a simulation with no movement simulator, in order to obtain a preliminary estimate of the trajectory of the moving body. If the preliminary trajectory obtained in this way proves incompatible with the capabilities of the movement simulator 2 and the target 4, the corrective term D1 to be applied is computed from the preliminary trajectory, the angular capabilities of the movement simulator 2 and the target 4 (it is assumed that these are known to the manufacturers of the movement simulator and the target), and the relative angular position of the movement simulator and the target.

To be more precise, the corrective term D1 is chosen to guarantee that the relative bearing component of the angular position of the target is included in the range of angular motion offered by the target and that the yaw component of the angular position of the movement simulator is compatible with the angular movement offered by the movement simulator. Once these two requirements have been met, the choice of the corrective term D1 may be further refined to make best use of the range of angular movement offered by the movement simulator.

For example, if the movement simulator 2 has an angular movement capacity of ±100° relative to geographical north, the target has an angular movement capacity ±40° relative to geographical north, and the preliminary trajectory of the moving body indicates moving south, i.e. at an angle of 180° relative to the geographical north, a corrective term D1 equal to −180° could be considered. The kinematics commands obtained after application of the corrective term D1 are then compatible with the angular movement of the movement simulator and the target.

Thus the logic unit 52 applies the corrective term D1 to the yaw component lC11 and the relative bearing component lC21. To be more precise, the logic unit 52 adds the corrective term D1 to the yaw component lC11 and the relative bearing component lC21 to generate respectively the yaw component lC12 and the relative bearing component lC22 (step E60):

$$lC12=lC11+D1 \text{ and } lC22=lC21+D1$$

The other components remain unchanged.

The logic unit 52 then sends the kinematics commands C12 and C22 obtained in this way to the movement simulator 2 and to the target 4 (transition T=0 shown in FIG. 1).

The kinematics commands C22 are applied to the target 4 which in response supplies its current position C24 (this is either the executed position or the really executed position in the meaning of the invention) (step E70).

Similarly, the kinematics commands C12 are received by the digital unit 22 of the movement simulator 2 and applied by the 3-axis table 21 to the moving body 3 (step E80).

In response to the movement applied by the movement simulator 2, the inertial navigation system 32 supplies measurement inertial data R (step E82) obtained from the rate gyros and accelerometers of the inertial navigation system 32.

Moreover, and simultaneously, the kinematics commands C14 really executed on the moving body 3 by the movement simulator 2 are sent to the computer 5 (step E84) in order to feed them to the theoretical model M1. These kinematics commands C14 are measured by angular sensors located on the movement simulator.

The theoretical model M1 evaluates from the commands C14 the theoretical inertial data T1 (step E86).

As explained above, to generate the theoretical inertial data T1, the theoretical model Ml includes a mathematical model of the physical phenomena exerted on a perfect inertial navigation system located at a point with fixed coordinates corresponding to the laboratory. This model M1 is identical to the models described in Documents EP 1 909 067 and FR 08 50793, published under the number 2 927 418.

Note that the theoretical inertial data T1 is deemed to be representative of the inertial data measured by the inertial navigation system 32 of the moving body 3 mounted on the movement simulator 2, that is to say inertial data measured at a point in the laboratory with fixed coordinates. The theoretical inertial data T1 and the measurement inertial data R supplied by the inertial navigation system are therefore identical apart from a difference resulting from the inherent (i.e. non-nominal) characteristics of the real inertial navigation system.

The measurement inertial data R (supplied by the inertial navigation system 32), the theoretical inertial data T1 (supplied by the theoretical model M1), and the simulation inertial data T2 (supplied by the simulator M2) generated in the iteration i are then used to evaluate the inertial data I (step E90) as follows:

$$I=R+T2-T1$$

Arithmetical operation means 54 and 33a known to the person skilled in the art are used for this, respectively located in the computer 5 and in the onboard computer 33, as shown in FIG. 1. Accordingly, the arithmetic operation means 54 initially evaluate the difference T2-T1 after which the arithmetic operation means 33a add this difference to the inertial data R.

The means 54 and 33a may instead both be located in the computer 5 or the onboard computer 33 or in some other device (e.g. the inertial navigation system or another computer). Moreover, other operations leading to the calculation of I may be effected.

The piloting commands P are then calculated by the onboard computer 33 as a function of this inertial data I and from the setpoint trajectory of the moving body as described above (step E100).

The piloting commands P are then fed to the simulator tool M2 during iteration i+1, after which the steps E10 to E100 are repeated on each iteration of the first part to generate the trajectory of the moving body.

The processing carried out by the logic unit 51 is described in detail below. As mentioned above, in each iteration this unit examines the distance d between the moving body and the first objective to determine the position of the moving body relative to the first objective and activates the transition T (T=1) if the moving body has overshot the first objective.

To be more precise, in each iteration, the unit 51 executes the following steps:
 if d≤dmin: dmin=d and cpt=0;
 else cpt=cpt+1; and
 if cpt>S1, then the transition T is activated (i.e. T=1).

S1, cpt and dmin respectively designate a predetermined threshold (chosen so as to be able to detect unambiguously overshooting of the first objective), a counter, and a minimum distance initialized to a value greater than the maximum distance to be considered between the moving body and the first objective.

Thus the transition T is activated if the minimum distance dmin is overshot over a plurality of iterations (at least S1 iterations), in other words if the moving body moves beyond the first objective. Activation of the transition T by the unit 51 thus constitutes detection of an event representative of overshooting of the first objective by the moving body in the meaning of the invention.

Of course, if what is of interest is the trajectory of the moving body in the event of a change of objective during the mission, the logic unit 51 could be adapted to activate the transition T on detection of the designation of a new objective (whether that change of objective occurs before or after overshooting the first objective).

The activation of the transition T by the logic unit 51 marks the beginning of the second part of the hybrid simulation. There is described below with reference to FIGS. 3A and 3B the main steps executed during this second part of the simulation, i.e. when the moving body attempts to reach the second objective, in other words, here, when it attempts to re-attack the objective O1.

The iterations of the second part of the simulation essentially unfold in a similar manner to the first part (steps E10-E40 and E82-E100). However, the kinematics commands C11 and C21 coming from the simulator tool M2 are now processed by a logic unit 53 (transition T=1 shown in FIG. 1) before they are fed to the movement simulator 2 (in order to be applied to the moving body 3) and to the target 4, respectively. The kinetic commands (here angular positions) fed by the logic unit 53 to the movement simulator 2 and to the target 4 are respectively designated C13 and C23 and the yaw and relative bearing components of the angular positions contained in the commands C13 and C23 are respectively designated lC13 and lC23.

According to the invention, following the activation of the transition T by the logic unit 51, two stages are implemented by the estimator system 1 of the invention:
  a first or "positioning" stage φ1 (shown in FIG. 3A), during which so-called transition kinematics commands are fed to the movement simulator 2 and to the target 4, replacing the kinematics commands C11 and C21, in order to position the moving body 3 in a direction close to that of the target 4 to re-attack the objective; and
  a second or "piloting" stage φ2 (shown in FIG. 3B), during which the logic unit 53 applies corrective terms to the kinematics commands C11 and C21 sent by the simulator tool to the movement simulator 2 and the target 4, in order to estimate the trajectory of the moving body 3 when it re-attacks the objective.

Thus, on activation of the transition T by the logic unit 52 (step F10), the stage φ1 of positioning the moving body 3 and the target 4 is initiated. In the remainder of the description, the iteration in which the transition T is activated is denoted i0.

The current values of the kinematics commands C11 and C21 and the executed kinematics commands C14 and C24 at the time of activation of the transition T are then stored by the logic unit 53 (step F20). These commands are respectively designated C11(i0), C21(i0), C14(i0), and C24(i0), and the yaw and relative bearing components of the angular positions associated with them are respectively designated lC11(i0), lC21(i0), lC14(10), and lC24(i0).

As described above, the object of the positioning stage φ1 is to position the moving body 3 and the target 4 at predetermined setpoint positions P1 and P2 so as to be able to observe the final stage of the attack on the objective O1 by the moving body, notably at the time of activating the terminal guidance device 31. The setpoint positions P1 and P2 are chosen here to obtain a direction of the moving body 3 and a direction of the target 4 after close angular positioning, for example less than 30°. However, this example is merely illustrative, and the setpoint positions P1 and P2 are preferably chosen to guarantee a latency between the time at which the setpoint positions are reached and the starting of the sensors of the moving body, in particular of its terminal guidance device.

Furthermore, for implementation reasons, the setpoint positions P1 and P2 depend here on the position of the moving body 3 relative to the objective O1 and more precisely on any change of direction effected by the moving body 3 to position itself in the direction of the target 4.

In the present example, the second objective is the same as the first objective. After the moving body has overshot the first objective, it must therefore change direction to be able to re-attack the first objective. Accordingly, the logic unit 53 initially determines the direction of the rotation effected by the moving body to turn to the direction of the objective O1 (step F30).

To this end it compares to a predetermined threshold S2 the absolute value of the difference between the current yaw component lC11 of the current iteration and the yaw component lC11(i0) (denoted |lC11−lC11(i0)|), if necessary over a plurality of iterations. This test is carried out for as long as this absolute value is not above the threshold S2:
  If |lC11−lC11(i0)| is above S2 and |lC11−lC11(i0)| is positive, the logic unit 53 determines that the moving body 3 should effect a clockwise change of direction.
  If |lC11−lC11(i0)| is above S2 and |lC11−lC11(i0)| is negative, the logic unit 53 determines that the moving body 3 should effect a counterclockwise change of direction.

The threshold S2 is chosen to make it possible to determine unambiguously the direction of rotation of the moving body (by an amount of the order of a few degrees).

During this step of determining the direction of rotation of the moving body, the logic unit 53 feeds the movement simulator and the target with constant transition kinematics commands C13 and C23, here taken as equal to C14(i0) and C24(i0), respectively. In other words, during this determination step, the logic unit 53 locks in particular the yaw component of the movement simulator and the relative bearing component of the target from the time of the transition from T=0 to T=1 and until the direction of rotation of the moving body has been determined. Note that because of the computation mode used to evaluate the inertial information I, locking has no impact on the validity of the piloting commands or on the trajectory. In fact, as the measurement inertial data R and the theoretical inertial data T1 both depend on the kinematic commands actually executed by the movement simulator, locking the yaw axis of the movement simulator has exactly the same repercussions on R and T1, and is therefore self-compensated in the computation of the inertial information I.

Moreover, in the present example, all components of the kinematics commands are locked and taken as equal to the corresponding components of C14(i0) and C24(i0).

Alternatively, only the yaw and relative bearing components are locked at the values of lC14(i0) and lC21(i0), respectively, whereas the other components are taken as equal either to the corresponding components of the current commands C11 and C21 or to arbitrary values.

Assuming that the kinematics commands also include an angular speed and an angular acceleration, the fact that the angular positions are constant implies of course that the components of the angular speed and the angular acceleration are zero.

Following determination of the direction of rotation of the moving body 3, the logic unit 53 positions the movement simulator and the target in the predetermined setpoint positions P1 and P2 chosen as a function of the direction of rotation of the moving body using the transition commands C13 and C23.

Thus if the direction of rotation is clockwise, the yaw axis of the movement simulator 2 is positioned to the left of the setpoint P1 (chosen negative) and the bearing axis of the target 4 to the right of the setpoint P2 (chosen positive), so that the final stage of the real movement of the moving body may be effected by the combination of the 3-axis table and the target.

Conversely, if the direction of rotation is counterclockwise, the yaw axis of the movement simulator 2 is positioned to the right of the setpoint P1 (chosen positive) and the bearing axis of the target 4 to the left of the setpoint P2 (chosen negative).

In these examples, opposite signs have been chosen for P1 and P2, verifying a predetermined angular difference, so as advantageously to manage the limits in terms of angular movement of the target and the movement simulator. P1 and P2 may be of any sign, however.

Note further that the "zero" positions of the target and the movement simulator may not coincide. However, taking into account the angular difference between the "zero" positions of the target and the movement simulator is not a problem for the person skilled in the art, who knows how to adapt the computations and operations described here accordingly.

Positioning the moving body and the target at the setpoint positions is effected as follows, as the iterations proceed:

For the moving body, $lC14$ designating during the positioning stage the position really executed by the moving body in response to the current transition kinematics commands for the iteration concerned:

if $lC14-P1>0$ (step F40): the yaw axis of the table is moved counterclockwise in each iteration (step F42); in other words, the yaw component of the transition kinematics command C13 fed to the movement simulator by the logic unit 53 is taken as equal to:

$$lC13=lC14-\epsilon 1$$

$\epsilon 1$ designating a small positive integer;

if $lC14-P1<0$ (step F40): the yaw axis of the table is moved clockwise in each iteration (step F44); in other words, the yaw component of the transition kinematics command C13 fed to the movement simulator by the logic unit 53 is taken as equal to:

$$lC13=lC14+\epsilon 1$$

The other angular position components of the transition kinematics command C13 are here taken as equal to the corresponding components of the current kinematics command C11 coming from the simulator tool.

Positioning is correct when it is detected that $lC14$ is at the setpoint P1, to within a threshold S3 that is preferably taken as close to 0 (step F46). Accordingly, as soon as it is detected that the position executed by the moving body is substantially equal to the setpoint position P1 (i.e. equal to P1 apart from the threshold S3), a marker f1 (a first marker in the meaning of the invention) is activated (f1=1) (step F48). The iteration in which the position P1 is reached and the marker f1 is activated is designated i1. The values $lC13(i1)$ and $lC14(i1)$ are then stored.

For the target, $lC24$ designating during the positioning stage the position executed by the target in response to the current transition kinematics commands for the iteration concerned:

if $lC24-P2>0$ (step F50): the relative bearing axis of the target is moved counterclockwise in each iteration (step F52); in other words, the relative bearing component of the transition kinematic command C23 fed to the target by the logic unit 53 is taken as equal to:

$$lC23=lC24-\epsilon 2$$

Where $\epsilon 2$ designates a small positive real number;

if $lC24-P2<0$ (step F50): the relative bearing axis of the table is moved clockwise in each iteration (step F54); in other words, the relative bearing component of the transition kinematics command C23 fed to the target by the logic unit 53 is taken as equal to:

$$lC23=lC24+\epsilon 2$$

The other angular position components of the transition kinematics command C23 are taken here as equal to the components of the current kinematics command C21 coming from the simulator tool.

Positioning is correct when it is detected that $lC24$ is at the setpoint P2, apart from a threshold S4 preferably taken as close to 0 (step F56). Accordingly, as soon as it is detected that the position executed by the target is substantially equal to the setpoint position P2 (i.e. equal to P2 apart from the threshold S4), a marker f2 (a second marker in the meaning of the invention) is activated (f2=1) (step F58). The iteration in which the position P2 is reached and the marker f2 is activated is designated i2. The values $lC23(i2)$ and $lC24(i2)$ are then stored.

Note that the markers f1 and f2 are not necessarily activated in the same iteration (i.e. i1 and i2 may be different). Furthermore, the moving body and the target may be positioned simultaneously or successively.

As soon as the logic unit 53 detects that the two markers f1 and f2 have been activated, the absolute value of the difference between the current yaw component $lC11$ and the current relative bearing component $lC21$ is evaluated and compared to a threshold determined from the absolute value of the difference between the positions $lC14(i1)$ and $lC24(i2)$ (step F60). This absolute value of the difference between the current yaw component $lC11$ and the current relative bearing component $lC21$ constitutes a difference between the current kinematics command supplied to the movement simulator and the current kinematics command supplied to the target by the simulator tool in the meaning of the invention.

This comparison therefore checks that the difference between the current angular positions of the movement simulator and the target in the horizontal plane, defined here by the absolute value of the difference between the current yaw component $lC11$ and the current relative bearing component $lC21$, is below a particular threshold. If so, a so-called piloting stage, described below, is then initiated.

To be more precise, in accordance with the above hypotheses for P1 and P2:

If the direction of rotation of the moving body determined in the step F30 is clockwise: while the condition (1) given by $(lC21-lC11)>(lC24(i2)-lC14(i1))$ is satisfied (step F60), the logic unit 53 sends the movement simulator and the target constant commands $lC13$ and $lC23$ equal to the latest values supplied to the movement simulator and the target, respectively, enabling the setpoint positions P1 and P2 to be reached (step F70). In other words, the logic unit 53 sends the movement simulator and the target fixed commands equal to the values lC13(i1) and lC23(i2), respectively.

If the direction of rotation of the moving body determined in the step F30 is counterclockwise: while the condition (2) given by (lC11−lC21)>(lC14(i1)−lC24(i2)) is satisfied (step F60), the logic unit 53 sends the movement simulator and the target constant commands lC13 and lC23 equal to the latest values supplied to the movement simulator and the target, respectively, enabling the setpoint positions P1 and P2 to be reached (step F70). In other words, the logic unit 53 sends the movement simulator and the target fixed commands equal to the values lC13(i1) and lC23(i2), respectively.

In a different implementation, the absolute value of the difference between the current yaw component lC11 and the current relative bearing component lC21 is compared to the absolute value of the difference between the positions P1 and P2 (the particular threshold in the meaning of the invention), using an approach similar to that described above for the positions lC14(i1) and lC24(12).

When the logic unit 53 detects that condition (1) or condition (2) is no longer satisfied, depending on the direction of rotation of the moving body, a marker f3 is activated and a so-called piloting stage T2 is initiated (step F80). The iteration in which the piloting stage is initiated is designated i3.

Note that the markers f1 and f2 must preferably be activated before condition (1) or (2), depending on the direction of rotation of the moving body, is no longer satisfied, in other words it is preferable for there to be a sufficient delay between the moment at which the markers f1 and f2 are activated and the moment at which the marker f3 is activated (even if a delay close to zero is sufficient). To this end, setpoint positions P1 and P2 making it possible to satisfy this condition may be chosen, or appropriate values of $\epsilon 1$ and/or $\epsilon 2$ (note that the higher these values, the greater the speed at which the setpoints P1 and P2 converge).

During the piloting stage $\phi 2$, the logic unit 53 applies to the kinematics commands C11 and C21 fed to the moving body and to the target corrective terms D2 and D3 linked to the setpoint positions P1 and P2. This enables simulation by the estimator system 1 of any type of movement of the moving body and the target, the terms D2 and D3 rendering these movements compatible with the angular movements of the movement simulator and the target.

To evaluate these corrective terms, the logic unit 53 stores the current yaw component lC11(i3) and the current relative bearing component lC21(i3) in the iteration i3 (step F90).

The corrective terms D2 and D3 are then evaluated using the following equations:

$$D2=lC14(i1)-lC11(i3) \text{ and } D3=lC24(i2)-lC21(i3)$$

Alternatively, the corrective terms D2 and D3 may be evaluated using the following equations:

$$D2=P1-lC11(i3) \text{ and } D3=P2-lC21(i3)$$

Thus in each iteration of the piloting stage, up to the end of the second part, the logic unit 53 applies to the yaw component lC11 and the relative bearing component lC21 the angular offsets D2 and D3, respectively, in accordance with the following equations (step F100):

$$lC13=lC11+D2$$

$$lC23=lC21+D3$$

The other components of the kinematics command C13, respectively the kinematics command C23, are taken here as equal to the corresponding components of the current kinematics command C11, respectively the current kinematics command C21, coming from the simulator tool.

The kinematics commands C13 and C23 modified in this way by the logic unit 53 are then fed to the movement simulator and to the target, respectively, for application. In response to these kinematics commands, the target delivers its current position.

At the end of the second part of the hybrid simulation, marked by the detection of an end of simulation event (step F110), for example reaching or overshooting the second objective, the trajectory of the moving body obtained by the estimator system 1 is examined.

In particular, it is determined whether the second objective has been reached, for example using the logic unit 51 and the distance d (step F120).

If so, it is determined whether the moving body 3 is able to re-attack its objective if it has overshot it (step F130). Otherwise the moving body is invalidated because it is deemed unable to re-attack an objective after missing it (step F140).

The invention claimed is:

1. A method of estimating a trajectory of a moving body in a real navigation environment, including a digital simulator tool that is modeling the moving body in this environment supplying kinematics commands to a movement simulator on which the moving body is mounted and to a target representative of an objective to be reached by the moving body, said digital simulator tool being fed with piloting commands delivered by a computer of said moving body and, in response to these piloting commands, delivering points of the trajectory, said estimation method further including:
    on detection of an event representative of overshooting or changing a first designated objective for the moving body, performing a positioning associated with a second designated objective for the moving body, the positioning including:
        comparing positions executed by the movement simulator in response to first transition kinematics commands with a first predetermined setpoint position and activating a first marker if a position substantially equal to the first setpoint position is detected;
        comparing positions executed by the target in response to second transition kinematics commands with a second predetermined setpoint position and activating a second marker if a position substantially equal to the second setpoint position is detected; and
    if the first and second markers are activated, evaluating a difference between the current kinematics command supplied to the movement simulator and the current kinematics command supplied to the target by the digital simulator tool; and
    if this difference is below a particular threshold, performing a piloting including applying corrective terms linked to said setpoint positions to the kinematics commands coming from the simulator tool before they are fed to the movement simulator and to the target.

2. The estimation method according to claim 1, wherein:
    said kinematics commands fed by the digital simulator tool to the movement simulator include a yaw component and said kinematics command fed by the digital simulator tool to the target include a relative bearing component; and
    until an event representative of overshooting or changing a first designated objective for this moving body is detected, an angular compensation term is applied to the yaw components and to the relative bearing components of the kinematics commands before they are fed to the movement simulator and to the target, respectively.

3. The estimation method according to claim 1 wherein, when a change of direction of the moving body is required in order to reach the second objective relative to a direction taken by the moving body to reach the first objective, the positioning further includes determining the direction of rotation of said moving body to change direction and the first and second setpoint positions are chosen as a function of that direction of rotation.

4. The estimation method according to claim 3, wherein the transition kinematics commands fed to the movement simulator and to the target are constant during the determining.

5. The estimation method according to claim 4, wherein the constant transition kinematics commands include the positions executed by the movement simulator and the target at the moment the event is detected.

6. The estimation method according to claim 3, wherein the threshold depends on the positions executed by the movement simulator and the target during activation of the first and second markers, respectively, and the direction of rotation of the moving body to change direction.

7. The estimation method according to claim 1, wherein the piloting further includes evaluating the corrective terms from:
   positions executed by the movement simulator and the target at the moment of activating the first and second markers, respectively; and
   kinematics commands supplied by the digital simulator tool at the moment it is detected that the difference is below the particular threshold.

8. The estimation method according to claim 1, wherein the piloting commands are evaluated by the computer of the moving body from:
   measurement inertial data supplied by an inertial navigation system of the moving body mounted on the movement simulator;
   simulation inertial data representative of inertial data deemed to be supplied by the inertial navigation system in the real navigation environment; and
   theoretical inertial data representative of measurement inertial data supplied by the inertial navigation system and evaluated from kinematics commands executed by the movement simulator.

9. The estimation method according to claim 8, wherein the piloting commands are calculated as a function of inertial data I defined by $I=T2+R-T1$ where $T2$, $R$, and $T1$ designate the simulation inertial data, the measurement inertial data, and the theoretical inertial data, respectively.

10. The estimation method according to claim 1, wherein the second objective is the same as the first objective.

11. The estimation method according to claim 1, further including verifying that the moving body reaches the second objective.

12. A hybrid simulation system for estimating a trajectory of a moving body in a real navigation environment, said system including:
   a movement simulator on which the moving body is mounted;
   a target representative of an objective to be reached by the moving body; and
   a digital simulator tool for modeling the moving body in the real navigation environment and feeding kinematics commands to the movement simulator and the target, said digital simulator tool being fed with piloting commands delivered by a computer of the moving body and delivering points of the trajectory in response to those piloting commands;
said system further including:
means for detecting an event representative of overshooting or changing a first designated objective for the moving body;
means activated on detection of such an event and during a positioning stage associated with a second designated objective for the moving body:
   for comparing positions executed by the movement simulator in response to first transition kinematics commands with a first predetermined setpoint position and activating a first marker when a position substantially the same as the first setpoint position is detected;
   for comparing positions executed by the target in response to second transition kinematics commands with a second predetermined setpoint position and activating a second marker when a position substantially the same as the second setpoint position is detected;
   for detecting when the first and second markers are activated and should the case occur for evaluating a difference between the current kinematics command fed to the movement simulator and the current kinematics command fed to the target by the digital simulator tool;
   for comparing this difference with a particular threshold; and
   activated when the difference is below said threshold to apply, during a piloting stage, corrective terms linked to the setpoint positions to the kinematics commands coming from the digital simulator tool before they are fed to the movement simulator and to the target.

* * * * *